(12) United States Patent
Ben-Arie

(10) Patent No.: US 9,612,447 B2
(45) Date of Patent: Apr. 4, 2017

(54) WIDE ANGLE VIEWING DEVICE

(71) Applicant: Jezekiel Ben-Arie, Chicago, IL (US)

(72) Inventor: Jezekiel Ben-Arie, Chicago, IL (US)

( * ) Notice: Subject to any disclaimer, the term of this patent is extended or adjusted under 35 U.S.C. 154(b) by 789 days.

(21) Appl. No.: 13/932,024

(22) Filed: Jul. 1, 2013

(65) Prior Publication Data

US 2015/0002764 A1  Jan. 1, 2015

(51) Int. Cl.
*G02F 1/1335* (2006.01)
*G02B 27/22* (2006.01)

(52) U.S. Cl.
CPC .............. *G02B 27/2228* (2013.01)

(58) Field of Classification Search
CPC ............................... G02B 27/2228
USPC ........................................ 349/13
See application file for complete search history.

(56) References Cited

U.S. PATENT DOCUMENTS

| | | |
|---|---|---|
| 4,049,339 A | 9/1977 | Ledan |
| 4,429,951 A | 2/1984 | Hirano |
| 4,597,634 A | 7/1986 | Steenblik |
| 4,705,371 A | 11/1987 | Beard |
| 4,717,239 A | 1/1988 | Steenblik |
| 5,002,364 A | 3/1991 | Steenblik |
| 5,144,344 A | 9/1992 | Takahashi |
| 6,598,968 B1 | 7/2003 | Davino |
| 7,508,485 B2 | 3/2009 | Jacobs |
| 2004/0108971 A1* | 6/2004 | Waldern ............ G02B 27/0093 345/8 |
| 2010/0007716 A1 | 1/2010 | Lee |
| 2010/0331912 A1* | 12/2010 | Tass ..................... A61M 21/00 607/54 |
| 2013/0120817 A1 | 5/2013 | Yoon |
| 2013/0135588 A1 | 5/2013 | Popovitch |

* cited by examiner

*Primary Examiner* — Charles Chang

(57) ABSTRACT

A device for 3D wide angle viewing, comprising of goggles made of opaque material installed with a set of Vector Light Sources (VLSs) which emit narrow light beams each pointing only in one direction. The set of VLSs is divided into two subsets. All the VLSs included in each subset are pointed towards the center location of their subset. The device enables viewing of a pair of stereoscopic images when the center locations are adjusted to fit the locations of pupils of the user. Each pixel of the stereoscopic images is focused because it is emitted by VLS. The VLSs are constructed by installing each light source at the end of a narrow tunnel which has the pointing direction of its VLS. Altogether, all the VLSs are arranged as two sets of concentric vectors. The light sources could be Light Emitting Diodes (LEDs), Liquid Cristal Displays (LCDs) or laser diodes.

19 Claims, 3 Drawing Sheets

WIDE ANGLE VIEWING DEVICE

CROSS-REFERENCE TO RELATED APPLICATIONS

This application claims the benefit of a provisional patent application: Ser. No. 61/690,653

FEDERALLY SPONSORED RESEARCH

Not Applicable

SEQUENCE LISTING OR PROGRAM

Not Applicable

BACKGROUND

The present invention relates to a viewing device which enables to view digital images in wide angles of view. In its 2D version, the viewing device could be used to view small light emitting screens from very short distances without the need for optical lenses. Viewing screens from very short distances enables wide angles of view without requirement for large screens. The principal innovation of this invention is the proposed conversion of each light emitting picture element (pixel) into a Vector Light Source (VLS). VLSs are light sources that emit a narrow beam of light only in one direction which corresponds to the vector's pointing direction. In our invention, all the pixels of an image are converted into VLSs which are pointed at a central point. Each VLS viewed from that central point appears in the visual field of view as a sharp point of light located at the opposite direction of the original VLS pointing direction. Hence, a large set of such VLSs could generate a wide angle spherical image, which could tessellate large parts of a sphere.

The technique of converting a light emitting source (pixel) into a VLS is quite simple. It entails placing each light source at the end of a narrow tunnel drilled in an opaque material. The light emitted at the other end of the tunnel forms a very narrowly pointed beam of light which has pointing direction as the direction of the tunnel. Another method to generate narrow beams of light is to place each light source behind a tiny lens which concentrates its light into a narrow beam.

In this invention we also propose to combine two of the 2D wide viewing angle devices described above into a stereoscopic 3D (Three-Dimensional) display device and, more particularly, to a stereoscopic 3D display device allowing humans to view 3D images and 3D video in wide angles of view, which could exceed 180 degrees both horizontally and vertically. For this purpose, this device could simultaneously display 2 or more, different, wide angle, high resolution color images at full frame rates. Such images could simulate the complete views naturally perceived by the left and the right eyes, thus creating a 3D display which emulates the complete natural views perceived by humans. The viewing angles enabled by this device could be much larger than the viewing angles provided by other 3D display devices such as 3D TVs, which are not capable of giving the viewer a full 3D sensation because their viewing angles are much narrower than natural human vision and does not provide views usually perceived by the peripheral human vision.

In order to provide sharp wide angle views with a device with small size, one has to project each pixel (picture element) of the image only in one concentric direction which matches the direction of a light ray emitted from that pixel in a 3D scene. The light beam emitted from that pixel must be very narrow and projected towards the center of the eye's pupil. If the light beams emitted from each pixel are not narrow enough, the view perceived by the viewer will be blurred. We name these one directional narrow light beams as Vector Light Sources (VLSs). Such VLSs could be constructed by a small light source such as a Light Emitting Diode (LED) which emits its light only in one directional narrow light beam. This could be achieved by placing the light source at the end of a very narrow tunnel like opening drilled in an opaque material wall. Another option is to create narrow, one directional vector light sources, is to place each one of the LEDs behind a small lens focused on the desired VLS direction.

The pointing directions of all these VLSs are arranged in a spherical dual-centric configuration. It means that the VLSs are divided into two equal sized sets. One VLS set, which includes approximately half of the VLSs are directed at one center, which corresponds to the location of one eye pupil and the second set of VLSs are directed at a second center which corresponds to the location of the second eye pupil.

The requirement for a spherical concentric or dual-centric set of directions does not mean that the VLSs must be installed on a spherical surface. In one embodiment of the invention, the VLSs could be installed on a non-spherical convex surface which could be used as a visor attached to a helmet or as goggles to be worn on the face. Even though the surface is non-spherical, the directions of the VLSs installed on the device must be dual-concentric i.e. half of the VLSs are directed at the center of one eye's pupil and the other half directed at the center of the second eye's pupil.

Half of the VLSs could be regarded as if each VLS is on a surface of a sphere in which each of the VLSs has a viewing direction that corresponds to the direction of a radial line that extends from the sphere's center to the location of the VLS. The actual viewing angles of the human eye cover a bit more than 180 degrees in the horizontal direction and a bit less than 180 degrees in the vertical direction. Therefore, in the actual embodiment, one could construct our 3D viewing device on a surface which extends a bit more than 180 degrees of accumulation of viewing directions in the horizontal plane of the left and the right eyes and a bit less in the vertical directions of both eyes. Since the surface could be non-spherical, the viewing directions of the VLSs installed on it do not have to be perpendicular to the goggles' surface. An example of such an embodiment is illustrated in FIG. 1.

BACKGROUND OF THE INVENTION

Prior Art

The principal requirement which is common to all 3D display systems is to display different images to the right and the left eye of the viewer. These images which are usually named as stereoscopic images, depict the same scene but with two different viewpoints which correspond to the two locations of the viewer's eyes. The average distance between the two eyes is about 6.25 cm in the horizontal direction. The difference in eye locations results in left and right images which depict objects in slightly different locations. The distance between the projections of corresponding objects in the left and right images is called disparity. The disparity is inversely proportional to the distance of the object from the viewer. Thus, when the object is close to the viewer, the disparity is large and it approaches zero when the object is far.

Patents on 3D display systems present a large variety of methods to generate stereoscopic imagery. The patents could be divided into 5 major approaches. The first 3 approaches utilize different means to display two different images to the left and the right eyes. The first method is called anaglyph and users have to wear glasses which have a blue (or green) transparency on one lens and red transparency on the other lens. The user is watching combined images that include the right image in one color and the left image in the second color. The transparencies split the combined image into two separate images which create the stereoscopic viewing. The anaglyph method has the disadvantage that the images perceived by the viewers are monochromatic because the color is used to separate them.

The second method, used by IMAX, employs light polarization to divide a combined image into stereoscopic image pair. Each image is a superposition of two stereoscopic images of the same scene. These images are polarized in two mutually orthogonal directions. The viewer wears spectacles with two polarized lenses. The polarization direction of the lenses is mutually orthogonal as well. It means that when an image is projected with a polarized light which has the same direction as one of the lenses, then this image passes the lens with very little attenuation. At the same time the second lens which has a polarizer with orthogonal direction w/respect to that image blocks its passage. This way, a combined image can be split into a stereoscopic pair. Such are the methods of Lee; Seung-Chul; et al. in 20100007716 who uses screen polarization, or the methods of Popovitch et al. in 20130135588.

Another method used by IMAX also uses shutter glasses for 3D viewing. This method of 3D projection involves the use of LCD shutter glasses with no polarization. The left and right eye images are projected on the viewing screen in alternate frames. These LCD shutter glasses are synchronized to the projector and the left eye views only the left image and the right eye the right image. The main disadvantage of this method is that the refresh rates of the video must by double of a regular video to avoid noticeable flicker. Many methods for synchronization of the spectacles were proposed, such as Jacobs in U.S. Pat. No. 7,508,485.

Another method uses holographic imagery such is the method of Yoon Minsung in 20130120817.

A number of products and methods have been developed for producing 3-D images from two-dimensional images employing the Pulfrich effect. This effect is based on the relation between the viewed light intensity to the reaction time of the eye photoreceptors. Steenblik in U.S. Pat. Nos. 4,597,634, 4,717,239, and 5,002,364 proposes the utilization of diffractive optical elements with double prisms, one prism being made of a low-dispersion prism and the second prism being made of a high-dispersion prism. Takahaski, et al in U.S. Pat. No. 5,144,344 describes the use of spectacles based on the Pulfrich effect with light filtering lens of different optical densities. Beard in U.S. Pat. No. 4,705,371 utilizes gradients of optical densities in going from the center to the periphery of a lens. Hirano in U.S. Pat. No. 4,429,951 proposes spectacles with lenses that can rotate about a vertical axis to create stereoscopic effects. Laden in U.S. Pat. No. 4,049,339 describes spectacles with opaque temples and an opaque rectangular frame, except for triangular shaped lenses positioned in the frame adjacent to a nosepiece.

Davino, U.S. Pat. No. 6,598,968, '3-Dimensional Movie and Television Viewer', promotes an opaque frame that can be placed in front of a user's eyes like a pair of glasses for 3-D viewing to take advantage of the Pulfrich effect. All the methods based on pulfrich effect have the disadvantage that they can simulate only three dimensional motion in one direction and are unable to present a stereoscopic image pair on static scene.

BRIEF SUMMARY

Our patent proposes a novel method of creating a stereoscopic image pair which has much wider viewing angles than all the previously proposed 3D viewing methods. Unlike previous methods our method uses direct projection of the stereoscopic image pair to both eyes in parallel so the video rates can be regular video rates. It does not need any spectacles or lenses which narrow the viewing angles considerably. The viewing angles provided by our display system are as wide as the maximum viewing angles of the human eyes. Thus, our display system provides a full 3D visual sensation. The principle of operation of the device for 3D wide angle viewing is by creating two subsets of concentric Vector Light Sources (VLSs) which emit narrow light beams each pointing only in one direction. It means that all the VLSs included in each subset are pointed towards the same center location of their subset. The device enables viewing of a pair of stereoscopic images when the center locations are adjusted to fit the locations of pupils of the user. Each pixel of the stereoscopic images is focused because it is emitted by a VLS, which emits a very narrow light beam. The VLSs are constructed by installing each light source at the end of a narrow tunnel which has the pointing direction of its VLS. Altogether, all the VLSs are arranged as two sets of concentric vectors. The light sources could be Light Emitting Diodes (LEDs), Liquid Cristal Displays (LCDs) or laser diodes.

BRIEF DESCRIPTION OF DRAWINGS

FIG. 4 describes an enlargement of a piece of the cross section illustrated by FIG. 1.
FIG. 5 illustrates a person wearing the goggles for wide angle viewing device.

DETAILED DESCRIPTION OF DRAWINGS AND MODUS OPERANDI

Figure 1:
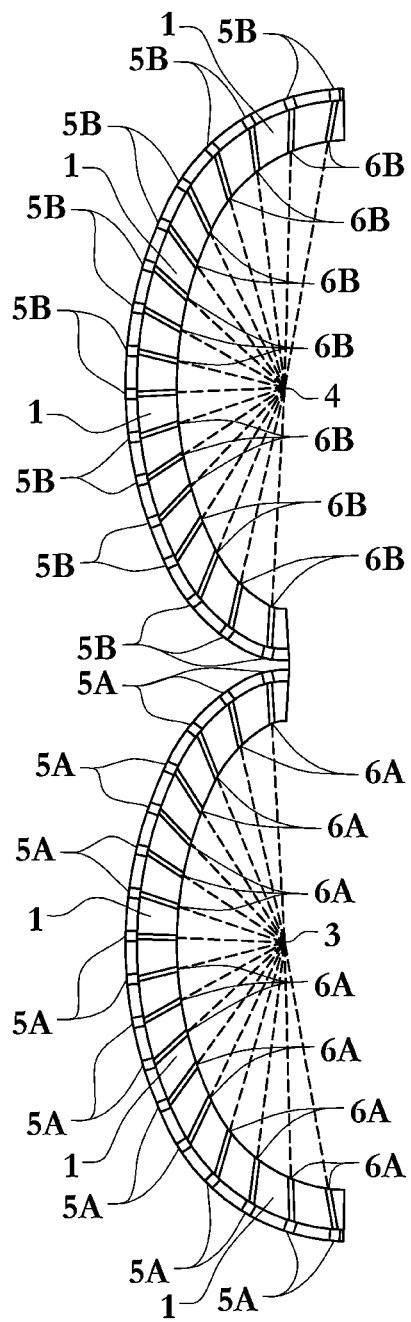
FIG. 1 illustrates a cross section of the goggles.
Figure 3:
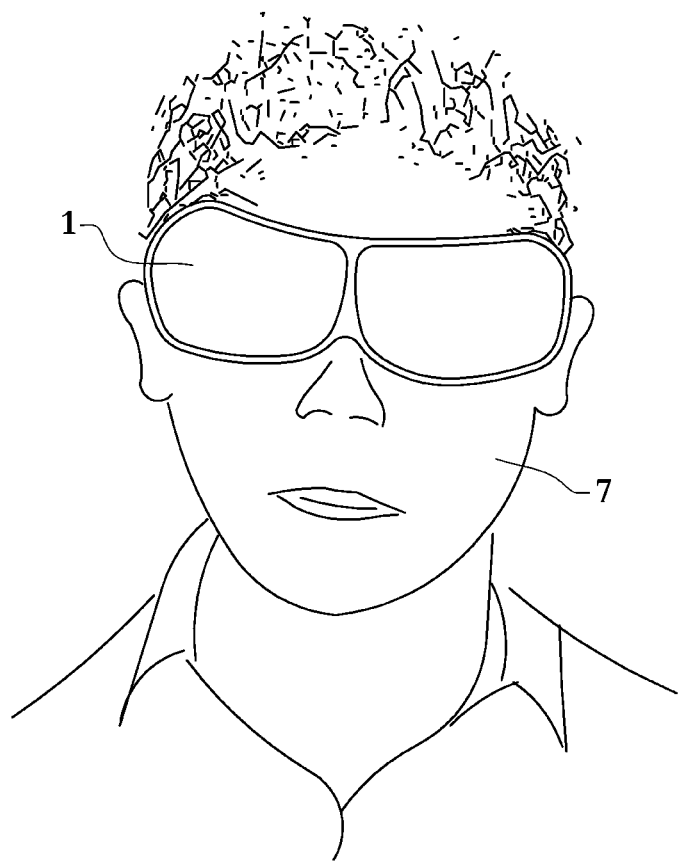
FIG. 3 illustrates a person wearing the wide angle viewing device goggles.

FIG. 1 illustrates a cross section of the goggles. The cross section of the convex wall of the goggles is denoted by the number 1. A segment of the cross section is enlarged in FIG. 4. The cross section 1 is riddled with many tunnels. The tunnels are very narrow relative to their lengths. Thus, such tunnels allow passage of light beams only in a very narrow range of directions. Placing a light source 5A or 5B at one end of such tunnel creates a Vector Light Source (VLS). Each VLS emits a narrow light beam only in one direction which is called the VLS's pointing direction. In FIG. 1 the VLSs are divided into two subsets denoted by 6A for one subset and 6B for the second subset. Each subset includes VLSs which are pointed at the subset's central point. The subset 6A is pointed at center 3 and subset 6B is pointed at center 4. So, the light beams of emitted by the VLSs of one subset are a radial set of lines that meet at their common center. These radial beams are illustrated in FIG. 1 by two concentric sets of broken lines. In FIG. 1 we have two centers 3 and 4. Each center concentrates the light beams of a subset of VLSs. The centers 3 and 4 correspond to the locations of the left and right eye pupils of the person 7 wearing the goggles 1. Since the light beams of each subset are concentric, the view perceived from their center is of a spherical surface tessellated by sharp points of light each emitted by another VLS. FIG. 3 depicts a person 7 wearing the goggles 1 for the wide angle viewing device.

When each VLS represents an image pixel, this VLSs configuration enables to directly display to the viewer two separate images, which could convey a complete stereoscopic pair view. The advantage of this approach is that it enables to display sharp stereoscopic views with very large viewing angles compared to other stereoscopic displays which have much narrower fields of view.

Figure 2:
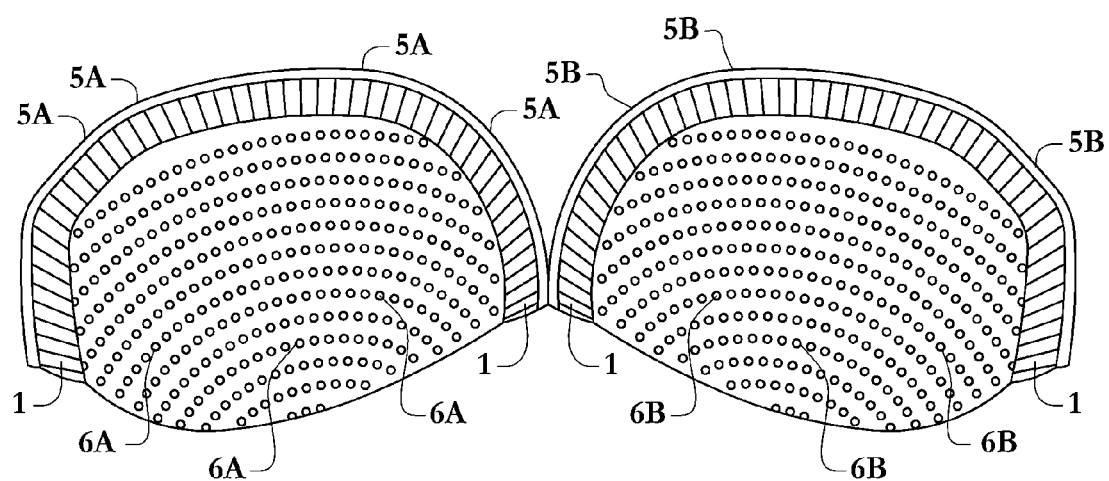
FIG. 2 illustrates a view of the goggles from the face side.

FIG. 2 depicts a frontal view of the goggles 1 as viewed by the user. The inner surface of the goggles is riddled with tunnel openings 6A and 6B. The tunnels are divided to two subsets 6A and 6B. Subset 6A is centered at center 3 and subset 6B is centered at center 4. FIG. 4 depicts an enlargement of a segment of the cross section 1. The tunnels 6A and 6B are open at one end and on the other end they have light sources 5A and 5B which correspond to tunnels 6A and 6B. Each tunnel creates one VLS. The tunnels are very narrow relative to their lengths in order to achieve very narrow ranges of directions for their light beams. FIG. 3 illustrates a user 7 wearing goggles 1. In order to display a stereoscopic image pair with the goggles, one has to transmit to the light sources 5A the intensities and colors of the pixels of left image and to the light sources 5B the intensities and colors of the pixels of the right image.

What is claimed is:

1. A wide angle viewing device comprising: a goggles made of opaque material; wherein said goggles has been installed with a set of vector light sources; wherein said vector light source is a light source which emits a light beam with a predetermined range of directions; wherein the middle direction of said predetermined range of directions is defined as said pointing direction of said vector light source;
   wherein each said light source displays a part of an image;
      wherein said set of said vector light sources is divided into two subsets; wherein each said subset has a center location; wherein all said vector light sources included in each said subset have said pointing directions which are pointed at said center location which pertains to said subset.

2. The wide angle viewing device of claim number 1 wherein two said center locations can be adjusted to fit the locations of the pupils of the left and right eyes of a user.

3. The wide angle viewing device of claim number 2, wherein each said subset of said vector light sources displays said image.

4. The wide angle viewing device of claim number 3 wherein each said vector light source comprising said light emitting diodes.

5. The wide angle viewing device of claim number 3, wherein said goggles comprising a multitude of tunnels; wherein each said tunnel has two tunnel ends; wherein each of said vector light sources is installed at separate said tunnel end; wherein said tunnel has said predetermined width which is narrow enough such that said tunnel allows light of said vector light source to propagate only in said predetermined range of directions.

6. The wide angle viewing device of claim number 3 wherein each said vector light source comprising said light sources controlled by said liquid crystal displays.

7. The wide angle viewing device of claim number 3 wherein each said vector light source is made of said light source installed behind said optical lens that focuses light only in said predetermined range of directions.

8. The wide angle viewing device of claim number 7 wherein each of said light sources comprising said light emitting diodes.

9. The wide angle viewing device of claim number 7 wherein each of said light sources comprising said light sources controlled by said liquid crystal displays.

10. The wide angle viewing device of claim number 1 wherein each said subset of said vector light sources displays said image.

11. The wide angle viewing device of claim number 1 wherein each said vector light source comprising light emitting diodes.

12. The wide angle viewing device of claim number 1 wherein each said vector light source comprising said light sources controlled by liquid crystal displays.

13. The wide angle viewing device of claim number 1, wherein said goggles comprising a multitude of tunnels; wherein each said tunnel has two tunnel ends; wherein each of said vector light sources is installed at a separate said tunnel end; wherein each said tunnel has a predetermined width which is narrow enough such that said tunnel allows said light beam of said vector light source to propagate only in said predetermined range of directions.

14. The wide angle viewing device of claim number 13 wherein each said vector light source comprising said light sources controlled by said liquid crystal displays.

15. The wide angle viewing device of claim number 13 wherein each said vector light source comprising said light emitting diodes.

16. The wide angle viewing device of claim number 1 wherein each said vector light source is made of said light source installed behind an optical lens that focuses light only in said predetermined range of directions.

17. The wide angle viewing device of claim number 16 wherein each of said light sources comprising said light sources controlled by said liquid crystal displays.

18. The wide angle viewing device of claim number 16 wherein each of said light sources comprising said light emitting diodes.

19. The wide angle viewing device of claim number 1 wherein said goggles comprising a multitude of tunnels; wherein each said tunnel has two tunnel ends; wherein each of said vector light sources is installed at separate said tunnel end; wherein each said tunnel has said predetermined width which is narrow enough such that said tunnel allows light of said vector light source to propagate only in said predetermined range of directions.

* * * * *